Aug. 28, 1928.
A. T. POTTER
1,682,185
WINDSHIELD CONSTRUCTION
Filed May 4, 1925   2 Sheets-Sheet 1
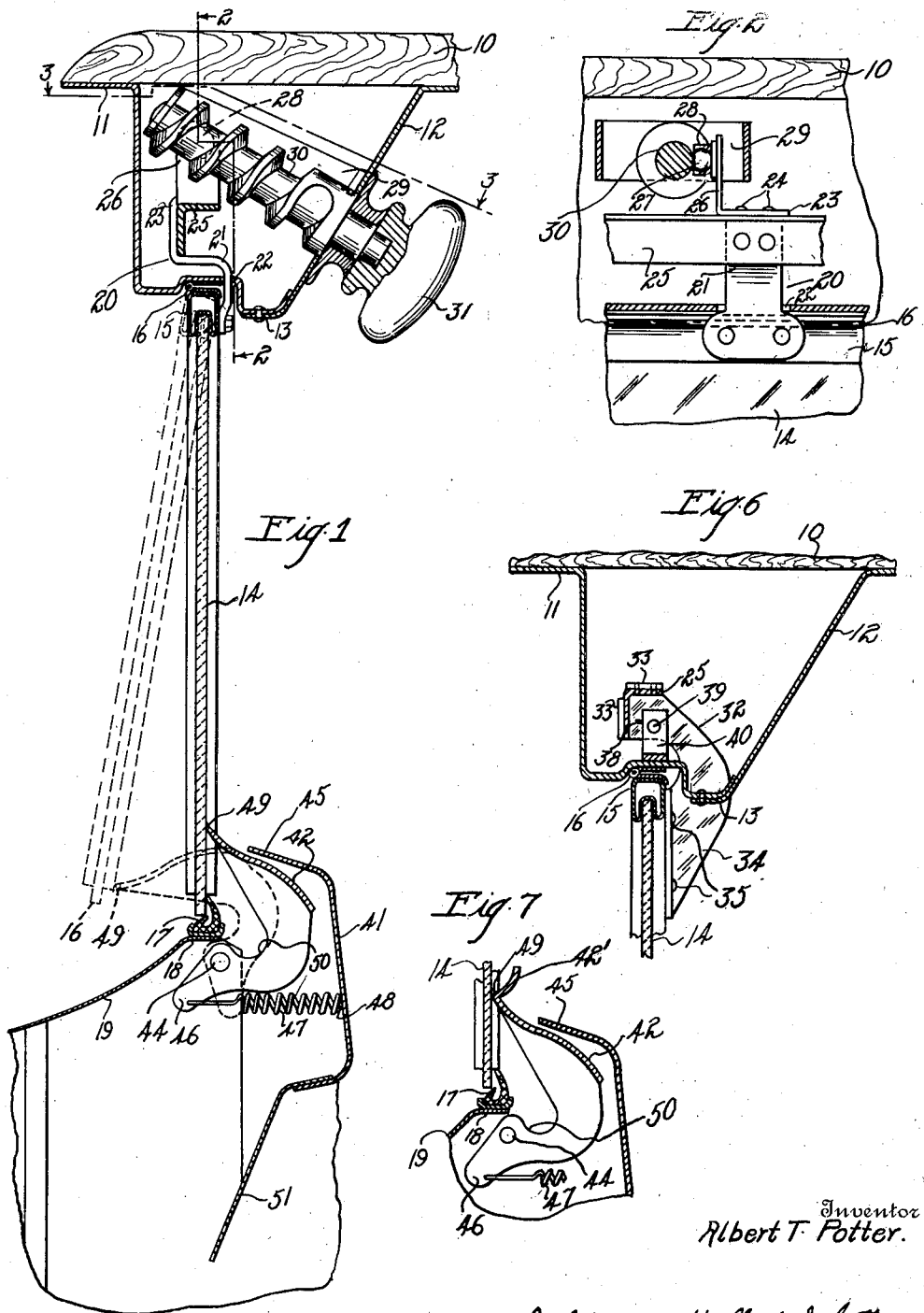
Inventor
Albert T. Potter.
By Whittemore Hulbert Whittemore
Belknap
Attorneys

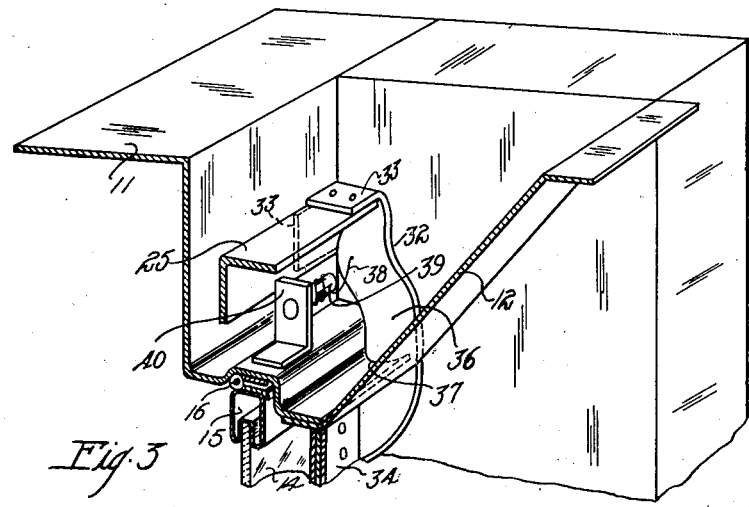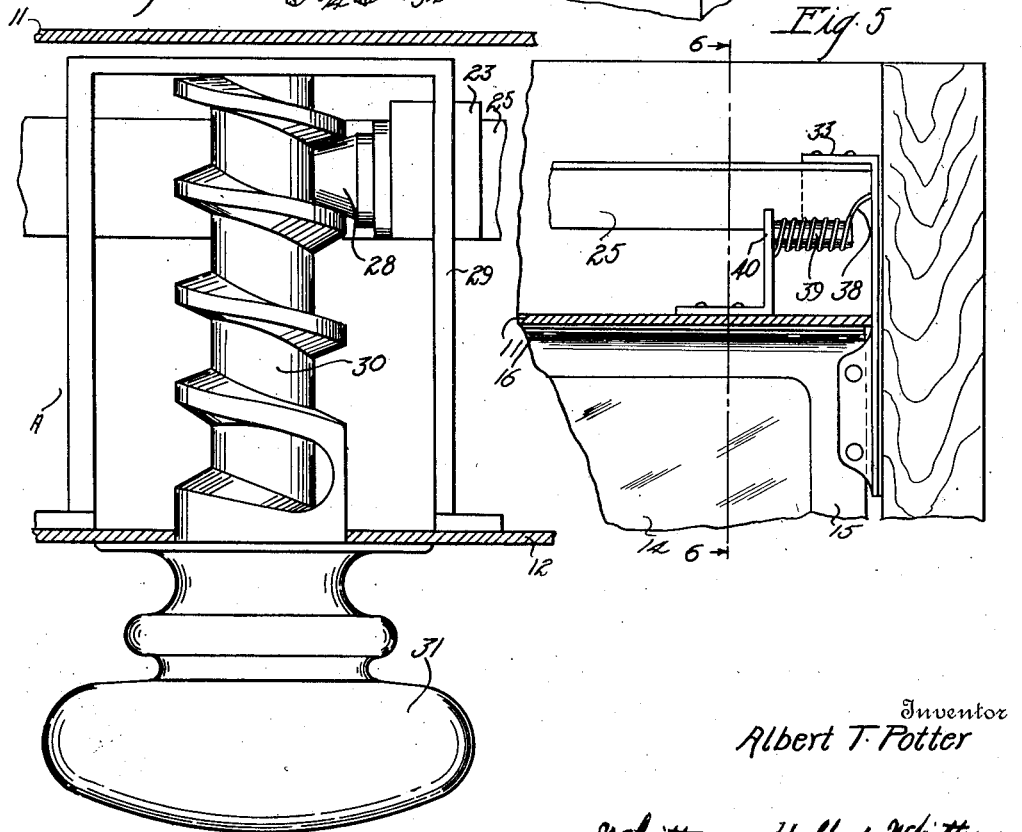

Patented Aug. 28, 1928.

1,682,185

UNITED STATES PATENT OFFICE.

ALBERT T. POTTER, OF DETROIT, MICHIGAN, ASSIGNOR TO AINSWORTH MANUFACTURING COMPANY, OF DETROIT, MICHIGAN, A CORPORATION OF MICHIGAN.

WINDSHIELD CONSTRUCTION.

Application filed May 4, 1925. Serial No. 27,991.

This invention relates to windshields and more particularly to improvements in windshield operating mechanism, together with improved ventilator means cooperating with and controlled by the windshield.

The invention has among its objects the production of a simple, compact, and readily operable means for adjusting the windshield, and has also as one of its principal objects the provision of a ventilator in an association with the windshield and adjacent vehicle body which results in an automatic control of the ventilator upon adjustment of the windshield and an efficiency of operation irrespective of the adjustment of the windshield.

The invention has also as one of its objects to simplify, render more efficient, and improve generally constructions of this general character. Other objects, advantages, and features of construction will be made more apparent as this description proceeds, especially when considered in connection with the accompanying drawings wherein Figure 1 is a fragmentary vertical longitudinal sectional view of a vehicle showing my improved invention, Figure 2 is an enlarged fragmentary sectional view taken substantially on the plane indicated by the line 2—2 in Figure 1, Figure 3 is a fragmentary horizontal sectional view taken substantially on the plane indicated by the line 3—3 in Figure 1, Figure 4 is a fragmentary perspective view showing certain details of construction, Figure 5 is a fragmentary vertical transverse sectional view, and Figure 6 is a sectional view taken substantially on the plane indicated by the line 6—6 in Figure 5.
Figure 7 is a fragmentary sectional view of a modified form of construction.

Referring now particularly to the drawings wherein like reference characters indicate like parts, it will be noted that there is secured to the roof or top frame 10 of the vehicle a windshield header 11, of a cross sectional shape substantially as illustrated, together with a panel or bracket plate 12 substantially inclined with reference to the true vertical plane and connected along one edge in any suitable manner to the top frame 10, and at its lower edge as at 13 to the adjacent edge of the windshield header by means of rivets or the like.
The reference character 14 indicates a conventional form of windshield provided with a channel bar frame 15 peripherally surrounding the windshield but connected to the header 11, constituting a part of the main supporting windshield frame by means of a hinge 16, the companion parts of which are secured respectively to the header 11 and windshield frame 15. The lower edge of the windshield, in the closed position of this element, is adapted to engage a weatherproofing strip 17 arranged on and secured to the horizontal ledge or sill 18 of the vehicle cowl 19. The hinge connection between the windshield and header permits of an outward swinging adjustment of the windshield away from the weatherproofing strip 17, in its open position.

Secured to the upper windshield frame part 15 at any suitable longitudinal point, but preferably substantially centrally thereof, is an arm 20 constituting an operating arm therefor. This arm extends upwardly in a substantially vertical direction and is provided with an intermediate bowed portion 21 curved on an arc described with the pivot of hinge 16 as its center, this curved portion of arm 20 extending through an opening 22 formed therefor in header 11. An angular portion 23 of arm 20 embraces and is secured, preferably by rivets 24, to a cross bar 25, this latter being preferably in the form of an angle bar. The upper end 26 of arm 20 carries a stud 27 upon which is mounted a roller 28. The axis of roller 28 is in substantial vertical alignment with and parallel to the plane of windshield 14.

Mounted upon panel plate 12 is a substantially U-shaped bracket 29 which, together with plate 12, forms a support for windshield operating element 30, preferably in the form of a worm or screw. The roller 28 operatively engages screw 30 between the spiral turns thereof so that upon a rotation of the screw by means of a knob on handle 31 arm 20 will be rocked, thus describing an arc the center of which is constituted by the pivotal connection of hinge 16. Owing to the rigid connection between arm 20 and windshield 14 this latter member will be swung outwardly as suggested by the dotted line position shown in Figure 1.

For equally distributing the adjusting effort of operating member 30 bar 25 is extended transversely of the vehicle a distance equal to the length of the windshield, this bar 25 being secured to the windshield at the sides thereof by bracket plates 32, having angular laterally bent portions 33 which are riveted or otherwise secured to the ends of bar 25, and having a lateral flange 34 at the other end thereof which is secured as for instance by rivets 35 to the vertical bars of windshield frame 15. The intermediate portion 36 of each bracket 32 is bowed or curved on an arc, the center of which is constituted by the pivots of hinges 16, these curved portions extending through suitable apertures 37 formed in header 11. Thus the windshield is rigidly connected to bar 25 at a plurality of longitudinally spaced points whereby the operating effort exerted upon the windshield by arm 20 is transmitted to bar 25 and distributed by this bar to the windshield at the adjacent longitudinally spaced points.

While the windshield 14 will normally assume, by gravity, its closed position shown in full lines in Figure 1, additional means for urging the windshield toward its closed position are provided, in the form of springs 38 coiled about studs 39 carried by angle plates or brackets 40 secured to windshield header 11. The ends of the coiled springs engage respectively adjacent bracket 32 and angle plate 40.

The reference character 41 indicates the instrument board of the vehicle arranged adjacent to but spaced from the cowl 19 in the customary manner. Arranged between the instrument board 41 and the lower edge of windshield 14 is a ventilator hood or shield 42 formed preferably with lateral downwardly directed extensions 43 by means of which the hood 42 is pivotally supported as at 44 upon adjacent portions of the vehicle. While the points of pivotal support of ventilator hood 42 are shown as arranged under sill 18 of cowl 19 the substantially horizontal hood 42 is, in its inoperative position, shown in full lines in Figure 1, substantially contained within or enclosed by the instrument board and particularly the lateral extensions 45 thereof. The downwardly projecting portions 43 of hood 42 are extended past pivots 44 to form arms 46 to which are connected springs 47, which are in turn connected as at 48 to instrument board 41. These springs tend normally to swing hood 42 about its pivots toward the dotted line position shown in Figure 1, which movement is, however, resisted by the engagement of the forward edge 49 of the hood with the windshield 14.

However, when windshield 14 is adjusted toward open position springs 47 will swing hood 42 and maintain edge portion 49 in engagement with windshield 14 during a portion of the movement of the latter. That is, hood 42 will follow windshield 14 in its movement until edges 50 of extensions 43 engage the edge of sill 18, whereupon the movement of hood 42 will be interrupted and the windshield may thereupon be adjusted further into open position while hood 42 remains in the position indicated in dotted lines in Figure 1. Upon return movement of windshield 14 it will obviously engage hood 42 and swing the same again into the position shown in full lines in Figure 1.

When the windshield is closed with its lower edge engaging weather-excluding strip 17 obviously no ventilation is possible and the air is absolutely excluded by the windshield. However, during the initial steps of adjustment of the windshield, that is during any of its positions of adjustment between the positions shown in full and dotted lines in Figure 1, air will be admitted, which air will pass rearwardly to the instrument board 41 and then forwardly under the cowl 19 and between the cowl and extension 51 carried by the windshield panel. It will be noted that even in the most extended position of hood 42 the rear edge thereof lies under the forward edge of lateral extensions 45 of the instrument board, so that air as well as the other outer elements will be intercepted from passing upwardly and against the occupants of the vehicle. As long as hood 42 is in engagement with the windshield in any of its open adjusted positions the ventilation will be limited to the air passing under hood 42 and through the passage way formed by the instrument board with its extensions and cowl 19. However, it is proposed to so proportion the operating member 30 and the other parts cooperating therewith, that the windshield may be swung upwardly a distance sufficient for instance to cause the lower edge of the windshield to clear the line of vision of the driver, and consequently in any of the positions in which the lower edge of the windshield is out of engagement with hood 42 air will also pass under the edge of the windshield and backwardly into the vehicle over the top of hood 42. However, even in such instances air will also be directed by the hood forwardly and downwardly under the cowl and this desired ventilation thus being also obtained.

In Figure 7 which is a fragmentary sectional view of the lower edge of the windshield, the hood 42 is shown as provided with an angular backwardly inclined flange or lip 42' which will deflect some air upwardly in those positions of the parts when the windshield has moved away from the hood 42.

The operating mechanism for the windshield is inherently self-locking, as will be immediately apparent, so that the windshield 14 will remain in any of its adjusted positions and will not be displaced therefrom even by the vibrations and jars of the vehicle in transit. Springs 38 which normally urge the windshield toward closed position tend to offset or equalize the opening effort exerted by springs 47 through the medium of hood 42. Hence windshield operating element 30 may be rotated and the windshield adjusted in either direction with a minimum amount of effort.

While an illustrative embodiment of this invention has been shown and described somewhat in detail it will be immediately apparent to those skilled in this art that various modifications in the details of construction as well as rearrangements of the parts may be resorted to, as found necessary or desirable, without departing from the spirit and scope of this invention and to this end reservation is made to make such changes as may come within the purview of the accompanying claims.

What I claim as my invention is:

1. In a windshield construction, a windshield, a support therefor, and operating means including, an operating member, an operating arm connected to the windshield and engaging said operating member, and a bar connected to said arm and to said windshield at spaced points.

2. In a windshield construction, a windshield, a support, means, at the upper edge thereof for hingedly connecting said windshield to said support, and operating means including, a worm screw, an arm connected to said windshield and engaging said worm screw, a bar connected to said arm and means connecting said bar to the windshield at spaced points.

3. In a windshield construction, a windshield, a support therefor, means for pivotally connecting said windshield to said support, operating means including an operating member, an operating arm connected to the windshield and having the upper portion thereof arranged in substantial vertical alignment with the pivotal connection aforesaid and engageable with said operating member and a bar connected to said arm and to said windshield at spaced points.

4. In a windshield construction, a windshield, a support therefor, means for pivotally connecting said windshield upon said support, operating means including an operating member, an operating arm connected to the windshield and having the upper portion thereof arranged in substantial vertical alignment with the pivotal connection aforesaid and engageable with said operating member, said arm further formed with an intermediate bowed portion curved on an arc described with the pivotal connection aforesaid as a center.

5. In a windshield construction, a channel-shaped header constituting a support for said windshield, and operating means disposed within said header including an operating member, an operating arm connected to the windshield and engaging said operating member, and a bar arranged within said header and extending substantially the full length of said windshield and connected to said arm and means connecting said bar to the windshield at spaced points.

6. In a windshield construction, a channel shaped header, a windshield hingedly mounted upon the lower edge of said header, an operating member arranged within said header, an operating arm secured to said windshield having a portion projecting into said header and engageable with said operating member, and means arranged within said header for distributing the effort of the operating means to a plurality of points on the windshield.

7. In a windshield construction, a support, a windshield hingedly mounted upon the support, operating means including an operating member, an operating arm connected to the windshield and engaging said operating member, and a bar extending longitudinally of said windshield and spaced above the pivotal connection of the latter to the support, said bar being connected to said arm and to said windshield at spaced points.

8. In a windshield construction, a channel shaped header, a windshield hingedly mounted upon the lower edge of said header, an operating member arranged within said header, a bar arranged within said header, and a member establishing a connection between said windshield, bar and operating member.

9. In a windshield construction, a support, a windshield hingedly mounted upon the support, operating means for said windshield including an operating member, a bar extending longitudinally of the windshield and spaced above the pivotal connection of the latter to the support, and an operating arm having one end secured to the windshield and having an intermediate bowed portion curved on an arc described with the pivotal connection aforesaid as a center and terminating in an upwardly extending portion secured to said bar and engaging said operating member.

10. In a windshield construction, a support, a windshield hingedly connected at one edge to said support, operating means for said windshield including an operating member, a bar spaced substantially above the said hinge connection and extending longitudinally of the windshield and an operating arm having one end secured to the opposite edge of said windshield and having an offset portion terminating in an upwardly extending portion arranged in substantial vertical alignment with the pivotal connection aforesaid, said upwardly extending portion being secured to said bar and having an extension engageable with the operating member.

In testimony whereof I affix my signature.

ALBERT T. POTTER.